United States Patent
Davidson et al.

(10) Patent No.: US 9,262,388 B2
(45) Date of Patent: *Feb. 16, 2016

(54) METHOD AND APPARATUS FOR VIEWING ELECTRONIC COMMERCE-RELATED DOCUMENTS

(71) Applicant: Open Invention Network, Durham, NC (US)

(72) Inventors: Andrew Everett Davidson, Boulder Creek, CO (US); Kelly Lane Schwarzhoff, Napa, CA (US); Gunawan Herri, Pleasanton, CA (US); Changyi Zhu, San Jose, CA (US); Ari Krish, Dublin, CA (US); Mulijadi Sulistio, Fremont, CA (US); Sun Keun Lee, Fremont, CA (US)

(*) Notice: Subject to any disclaimer, the term of this patent is extended or adjusted under 35 U.S.C. 154(b) by 106 days.

This patent is subject to a terminal disclaimer.

(21) Appl. No.: 14/054,777

(22) Filed: Oct. 15, 2013

(65) Prior Publication Data

US 2014/0095983 A1  Apr. 3, 2014

Related U.S. Application Data

(60) Continuation of application No. 12/190,493, filed on Aug. 12, 2008, now Pat. No. 8,561,022, which is a division of application No. 09/794,302, filed on Feb. 27, 2001, now Pat. No. 7,415,669.

(51) Int. Cl.
| | |
|---|---|
| G06F 9/44 | (2006.01) |
| G06F 17/21 | (2006.01) |
| G06F 17/22 | (2006.01) |
| G06F 17/30 | (2006.01) |
| G06Q 10/10 | (2012.01) |

(52) U.S. Cl.
CPC .......... *G06F 17/2247* (2013.01); *G06F 17/227* (2013.01); *G06F 17/30905* (2013.01); *G06Q 10/10* (2013.01); *Y10S 707/99936* (2013.01)

(58) Field of Classification Search
None
See application file for complete search history.

(56) References Cited

U.S. PATENT DOCUMENTS

| | | | |
|---|---|---|---|
| 4,402,569 A | | 9/1983 | Bow et al. |
| 4,418,689 A | | 12/1983 | Kanazawa et al. |
| 4,944,738 A | | 7/1990 | Rodriguez |
| 5,269,779 A | | 12/1993 | Sogawa et al. |
| 5,300,061 A | | 4/1994 | Easley et al. |
| 5,557,722 A | * | 9/1996 | DeRose et al. ............... 715/234 |

(Continued)

FOREIGN PATENT DOCUMENTS

| | | |
|---|---|---|
| EP | 0704795 A1 | 4/1996 |
| WO | 9834179 A1 | 8/1998 |

OTHER PUBLICATIONS

Bergeron, F., et al., "Managing EDI for corporate advantage: A longitudinal study," Information &Management, 31, 1997, pp. 319-333, Elsevier.

(Continued)

*Primary Examiner* — Tuan Q. Dam
*Assistant Examiner* — Zheng Wei
(74) *Attorney, Agent, or Firm* — Haynes Beffel & Wolfeld LLP

(57) ABSTRACT

The present invention includes a method of providing users with formatted access to XML and similar documents received from trading partners using a general purpose viewer or browser. Particular aspects of the present invention are described in the claims, specification and drawings.

12 Claims, 9 Drawing Sheets

(56) References Cited

U.S. PATENT DOCUMENTS

| | | | |
|---|---|---|---|
| 5,557,798 A | 9/1996 | Skeen et al. | |
| 5,607,420 A | 3/1997 | Schuman | |
| 5,662,646 A | 9/1997 | Fumich | |
| 5,675,805 A * | 10/1997 | Boldo | G06F 8/30 717/114 |
| 5,684,985 A | 11/1997 | Ahmadi | |
| 5,706,502 A * | 1/1998 | Foley | G06F 8/20 707/827 |
| 5,733,279 A | 3/1998 | Konwitz et al. | |
| 5,734,916 A | 3/1998 | Greenfield et al. | |
| 5,742,845 A | 4/1998 | Wagner | |
| 5,772,658 A | 6/1998 | Konwitz et al. | |
| 5,778,400 A | 7/1998 | Tateno et al. | |
| 5,790,677 A | 8/1998 | Fox et al. | |
| 5,812,999 A | 9/1998 | Tateno | |
| 5,860,073 A * | 1/1999 | Ferrel et al. | 715/255 |
| 5,923,833 A | 7/1999 | Freund et al. | |
| 5,963,641 A | 10/1999 | Crandall et al. | |
| 5,983,200 A | 11/1999 | Slotznick | |
| 6,012,098 A | 1/2000 | Bayeh et al. | |
| 6,023,714 A * | 2/2000 | Hill et al. | 715/235 |
| 6,026,432 A | 2/2000 | Potts, Jr. | |
| 6,049,785 A | 4/2000 | Gifford | |
| 6,055,513 A | 4/2000 | Katz et al. | |
| 6,125,391 A | 9/2000 | Meltzer et al. | |
| 6,138,129 A | 10/2000 | Combs | |
| 6,175,843 B1 * | 1/2001 | Muramoto | G06F 17/218 707/E17.118 |
| 6,216,158 B1 | 4/2001 | Luo et al. | |
| 6,226,675 B1 | 5/2001 | Meltzer et al. | |
| 6,230,201 B1 | 5/2001 | Guck et al. | |
| 6,240,407 B1 | 5/2001 | Chang et al. | |
| 6,243,501 B1 | 6/2001 | Jamali | |
| 6,311,194 B1 | 10/2001 | Sheth et al. | |
| 6,330,573 B1 | 12/2001 | Salisbury et al. | |
| 6,330,574 B1 | 12/2001 | Murashita et al. | |
| 6,338,067 B1 | 1/2002 | Baker et al. | |
| 6,360,215 B1 | 3/2002 | Judd et al. | |
| 6,421,656 B1 | 7/2002 | Cheng et al. | |
| 6,480,860 B1 | 11/2002 | Monday | |
| 6,493,702 B1 | 12/2002 | Adar et al. | |
| 6,507,857 B1 | 1/2003 | Yalcinalp | |
| 6,519,617 B1 * | 2/2003 | Wanderski et al. | 715/235 |
| 6,538,673 B1 | 3/2003 | Maslov | |
| 6,553,364 B1 | 4/2003 | Wu | |
| 6,582,474 B2 | 6/2003 | LaMarca et al. | |
| 6,585,778 B1 * | 7/2003 | Hind | G06F 17/2247 715/235 |
| 6,589,291 B1 | 7/2003 | Boag et al. | |
| 6,591,260 B1 | 7/2003 | Schwarzhoff et al. | |
| 6,635,089 B1 | 10/2003 | Burkett et al. | |
| 6,650,433 B1 | 11/2003 | Keane et al. | |
| 6,684,204 B1 | 1/2004 | Lal | |
| 6,699,239 B1 | 3/2004 | Stiller et al. | |
| 6,715,129 B1 | 3/2004 | Hind et al. | |
| 6,721,727 B2 | 4/2004 | Chau et al. | |
| 6,763,343 B1 * | 7/2004 | Brooke et al. | 717/115 |
| 6,799,299 B1 * | 9/2004 | Li | G06F 17/2247 715/235 |
| 6,826,597 B1 * | 11/2004 | Lonnroth et al. | 709/207 |
| 6,874,122 B1 * | 3/2005 | Bates | G06F 17/2247 715/236 |
| 6,874,141 B1 | 3/2005 | Swamy et al. | |
| 6,917,937 B1 | 7/2005 | Rubendall | |
| 6,941,511 B1 * | 9/2005 | Hind | G06F 17/2205 707/E17.006 |
| 6,959,429 B1 * | 10/2005 | Hatcher | G06F 17/30 707/999.104 |
| 7,010,533 B1 | 3/2006 | Kutsumi et al. | |
| 7,036,072 B1 | 4/2006 | Sulistio et al. | |
| 7,058,886 B1 | 6/2006 | Sulistio et al. | |
| 7,072,984 B1 | 7/2006 | Polonsky et al. | |
| 7,089,583 B2 | 8/2006 | Mehra et al. | |
| 7,237,191 B1 | 6/2007 | Sulistio et al. | |
| 7,266,766 B1 | 9/2007 | Claussen et al. | |
| 7,266,814 B2 | 9/2007 | Bosworth et al. | |
| 7,278,096 B2 | 10/2007 | Sulistio et al. | |
| 7,305,614 B2 | 12/2007 | Chen et al. | |
| 7,310,350 B1 * | 12/2007 | Shao et al. | 370/466 |
| 7,321,870 B1 | 1/2008 | Comiskey et al. | |
| 7,380,206 B1 * | 5/2008 | Usuda | 715/236 |
| 7,415,669 B1 | 8/2008 | Davidson et al. | |
| 7,631,298 B2 * | 12/2009 | Kaler | A61M 5/1689 717/120 |
| 7,685,252 B1 * | 3/2010 | Maes et al. | 709/217 |
| 7,707,492 B2 | 4/2010 | Zaharkin | |
| 8,504,988 B2 * | 8/2013 | DeGroote | G06F 17/24 717/117 |
| 2001/0049650 A1 | 12/2001 | Moshal et al. | |
| 2001/0056429 A1 | 12/2001 | Moore et al. | |
| 2002/0002586 A1 | 1/2002 | Rafal et al. | |
| 2002/0049788 A1 | 4/2002 | Lipkin et al. | |
| 2002/0054090 A1 | 5/2002 | Silva et al. | |
| 2002/0069083 A1 | 6/2002 | Harter et al. | |
| 2002/0073001 A1 * | 6/2002 | Palmer | G06Q 30/02 705/29 |
| 2002/0083093 A1 | 6/2002 | Goodisman et al. | |
| 2002/0087592 A1 | 7/2002 | Ghani | |
| 2002/0099735 A1 | 7/2002 | Schroeder et al. | |
| 2002/0107763 A1 * | 8/2002 | Palmer | G06Q 10/0875 705/29 |
| 2002/0107881 A1 | 8/2002 | Patel | |
| 2002/0116421 A1 | 8/2002 | Fox et al. | |
| 2002/0135621 A1 | 9/2002 | Angiulo et al. | |
| 2002/0143818 A1 | 10/2002 | Roberts et al. | |
| 2002/0143823 A1 | 10/2002 | Stevens | |
| 2002/0147847 A1 | 10/2002 | Brewster et al. | |
| 2002/0156803 A1 | 10/2002 | Maslov et al. | |
| 2003/0041076 A1 | 2/2003 | Lucovsky et al. | |
| 2003/0065874 A1 | 4/2003 | Marron et al. | |
| 2003/0088824 A1 | 5/2003 | Ayan | |
| 2003/0125929 A1 | 7/2003 | Bergstraesser et al. | |
| 2003/0140034 A1 | 7/2003 | Probst et al. | |
| 2003/0208473 A1 | 11/2003 | Lennon | |
| 2004/0162773 A1 | 8/2004 | Del Rey et al. | |
| 2004/0205448 A1 | 10/2004 | Grefenstette et al. | |
| 2004/0205456 A1 | 10/2004 | Hammock et al. | |
| 2004/0205459 A1 | 10/2004 | Green | |
| 2004/0205615 A1 | 10/2004 | Birder | |
| 2004/0205644 A1 | 10/2004 | Shaughnessy et al. | |
| 2005/0251742 A1 * | 11/2005 | Mogilevsky et al. | 715/521 |
| 2006/0156224 A1 | 7/2006 | Sulistio et al. | |
| 2008/0301544 A1 | 12/2008 | Davidson et al. | |
| 2008/0306883 A1 | 12/2008 | Baffier et al. | |
| 2009/0043798 A1 | 2/2009 | Tan et al. | |
| 2010/0333153 A1 | 12/2010 | Sahota et al. | |

OTHER PUBLICATIONS

Bonometti, R. J., et al., "The Walls Coming Down: Interoperability Opens the Electronic City," The Future of the Electronic Marketplace, The MIT Press, Cambridge, Massachusetts, 1998, pp. 265-301.

Bort, R., et al., "EDI on the Internet," Handbook of EDI, 1997, pp. B7-1-B7-19, Warren, Gorham & Lamont, USA.

Gallego, I., et al., "Distributed Models for Brokerage on Electronic Commerce," TREC'98, LINCS 1402, 1998, pp. 129-140, Springer-Verlag Berlin Heidelberg.

Garguilo, J. J., et al., "Guidlines for the Evaluation of Electronic data Interchange Products," Draft—Technical Report CAML/CLS, Dec. 6, 1995, Gaithersburg, MD, USA.

Ghosh, S., "Making Business Sense of the Internet," Harvard Business Review, Mar.-Apr. 1998, pp. 126-135.

Li-Pheng, K., "The Potential of Intelligent Software Agents in the World Wide Web in Automating Part Procurement," International Journal of Purchasing and Materials Management, Jan. 1998, pp. 46-52.

Riggins, F., et al., "Toward a Unified View of Electronic Commerce," Communications of the ACM, Oct. 1998, vol. 41, No. 10, pp. 88-95.

Rodrigues, J. R., et al, "IBM Websphere Transcoding Publisher Version 1.1: Extending Web Applications to the Pervasive World", IBM Redbook, 2000, 336 pages.

(56) References Cited

OTHER PUBLICATIONS

Clark, J., "XSL Transformations (XSLT)," Version 1.0 W3C Recommendation Nov. 16, 1999, pp. 1-102.
Ide, N., "The XML Framework and Its Implications for Corpus Access and Use," published 2000, pp. 1-5.
Kay, M., "XLST 2.0 and XPath 2.0, Programmer's Reference, 4th edtiion", Wiley Publising, Inc., 2008, 1371 pages.
Kay, M., "Things XSLT Can't Do", retrieved from: >www.dpawson. co.uk/xsl/sect2/nono.html#d1874e495> (accessed Aug. 9, 2012), 19 pages.
Seilonen, et al., "Experience from the Development of an XML/XSLT-based Integration Server for a Virtual Enterprise Type Co-Operation," published by 7th International Conference on Concurrent Enterprising Jun. 27-29, 2001, pp. 1-8.
Nair, D. R., "Visual Design Versus Development: A Case Study Presenting How XML and XSLT can separate Presentation From Data," published by University of Florida, 2001, pp. 1-97.
Harold, E.R., "XML: Extensible Markup Language," IDG Books Worldwide, Inc., Foster City, CA, Copyright 1998, pp. 14-15, 37-42 and 259-271 (23 pages total).
Eddy, S. T., et al., "Teach Yourself XML," IDG Books Worldwide, Inc., Foster City, CA, .COPYRGT. 1999, pp. 303-313 and 433-443.
Holman, G.K., "What is XSLT", Retrieved from: <http://www.xml.com/pub/a/2000/08/holman/index.html>, Dec. 7, 2000, pp. 1-337.
"The American Heritage College Dictionary," 4th Edition, Houghton Mifflin Co., Boston, Copyright 2002, p. 705.
Freire, J., et al., "WebViews: Accessing Personalized Web Content and Services", WWW 10, Hong Kong, May 1-5, 2001, pp. 576-586.
"Deja Power Search Graphical User interface", downloaded from: www.exit109.com/about.jeremy/news/deja.html, .COPYRGT. Feb. 12, 2000, pp. 1-20.
Altinel, M., et al., "Efficient Filtering of XML Documents for Seletive Dissemination of Information", Proceedings of the VLDB Conference, Cairo, Egypt, Sep. 10-14, 2000, pp. 53-64.
Ambroziak, J., "Managing Tokenizers in XML Search", XML Europe 2000, Paris, France, Jun. 12-16, 2000, pp. 1-7.
"GCA Conference Flyers", XML Europe 2000, Paris, France, Jun. 12-16, 2000, pp. 1-2.
"XML Query Engine Provides Initial XQuery Support", XML Coverpages, downloaded from: xml.coverpages.org/ni2001-04-27-c.html, Apr. 27, 2001, 1 page.
Egnor, D., et al., "Structured Information Retrieval Using XML", Proceedings of the ACM SIGIR 2000 Workshop on XML and Information Retrieval, Athens, Greece, Jul. 2000, pp. 1-10, Retrieved from the internet: <web.archive.org/web/20010723114842/http://www.haifa.il.ibm.com/sigir00-xm-1/final-papers/Egnor/>.
Carlson, D., "Modeling XML Vocabularies with UML: Part I," Aug. 22, 2001, Retrieved from the internet: <http://www.xml.com/pub/a/2001/08/22/uml.html>, pp. 1-5.
Bray, T., et al. (ed). "Extensible Markup Language (XML) 1.0," W3C Recommendation, Feb. 10, 1998, Retrieved from the internet: <http://www.w3.org/TR/1998/REC-xml-19980210>, 37 pages.
Chappell, D., "Simple Object Access Protocol (SOAP)," Microsoft Windows: Simple Object Access Protocol Technical Article, Sep. 10, 1999, Microsoft Corporation, 6 pages.
Chung, P.E, et al. "DCOM and CORBA Side by Side, Step by Step, and Layer by Layer," Copyright 1997, Retrieved from the internet: <http://www.cs.wustl.edu/~schmidt/submit/Paper.html>, 24 pgs.
Finn, Tim, et al. "KQML as an Agent Communication Language," Draft, Baltimore MD, USA, Sep. 1995, 22 pages.
Fuchs, M., "Domain Specific Languages for ad hoc Distributed Applications," USENIX Association, Conference on Domain-Specific Languages, Oct. 15-17, 1997, pp. 27-35.
Howes, T., et al. "A Scalable, Deployable, Directory Service Framework for the Internet," Jul. 11, 1995, Retrieved from the Internet: <http://infor.isoc.org/HMP/PAPER/173/html/paper.html>, 12 pages.

Khoo, L., et al., "The Potential of Intelligent Software Agents in the World Wide Web in Automating Part Procurement," International Journal of Purchasing and Materials Management, Jan. 1998, pp. 46-52.
Kimbrough, S. O., et al. "On Automated Message Processing in Electronic Commerce and Work Support Systems: Speech Act Theory and Expressive Felicity," ACM Transactions on Information Systems, vol. 15, No. 4, Oct. 1997, pp. 321-367, New York, NY, USA.
Tenenbaum, J., et al.,"Eco System: An Internet Commerce Architecture," IEEE Computer Journal, May 1997, pp. 48-55.
"The Internet—Untangling the Web," The Economist, Apr. 23, 1998, 3 pages.
Brickley, D., et al., "Resource Description Framework (RDF) Schema Specification", W3C Proposed Recommendation Mar. 3, 1999, W3C XP-002203858, Retrieved from the Internet: <http://w3.org/TR/1999/PR-rdf-schema-19990303>, pp. 1-29.
Beech, D., et al. (ed). "XML Schema Part 1: Structures", W3C Working Draft May 6, 1999, W3C XP-002203859, Retrieved from the internet: <http://www.w3.org/1999/05/06-xmlschema-1>, pp. 1-53.
Biron, P. V. et al. (ed.) "XML Schema Part 2: Datatypes" World Wide Web Consortium Working Draft May 6, 1999, W3C XP-00203860, Retrieved from the internet: <http://www.w3.org/1999/05/06-xmlschema-2>, pp. 1-28.
Brown, K., "BizTalk: Fluent in E-Business", XP-002203861, Copyright Dec. 1999, pp. 1-6.
Yeong, W., et al. "Lightweight Directory Access Protocol", ISODE Consortium, Mar. 1995, 20 pages.
Moats, R., "URN Syntax," AT&T, May 1997, pp. 1-7.
Narayanaswamy, K. et al. "An Incremental Mechanism for Schema Evolution in Engineering Domains", IEEE 1988, pp. 294-300.
Klarlund, N., et al. "Document Structure Description 1.0", AT&T and BRICS 1999, XP-002203865, pp. 1-34.
Davidson, A., et al. "Schema for Object-Oriented XML 2.0" W3C Note Jul. 30, 1999, W3C XP-002203857, Retrieved from: <http://www.w3.org/1999/07/NOTE-SOX-19990730>, pp. 1-22.
Liechti, O., et al. "Structured graph format: XML metadata for describing Web site structure," Computer Networks and ISDN Systems 30 (1998), 11 pages.
Kristensen, A., "Template resolution in XML/HTML" Computer Networks ISDN Systems 30 (1998) pp. 239-249.
Dudeck, J., "Aspects of Implementing and Harmonizing Healthcare Communication Standards," Institute of Medical Informatics 48 (1998), pp. 163-171.
"Document Object Model (DOM) Tutorial," Oct. 30, 2000, Retrieved from the internet: <http://web.archive.org/web/20010212070738/http://www.thescarms.com/XML/DOMTutorial.asp>, pp. 1-10.
"XML and EDI: Peaceful Co-Esistence," 2001, Xedi.org White Paper, pp. 1-15.
Van Der Vlist, E., "Comparing XML Schema Languages," Dec. 12, 2001, Retrieved from the internet: <http://www.xml.com/pub/a/2001/12/12/schemacompare.html>, pp. 1-7.
Ogbuji, C., "Validating XML with Schematron," Nov. 22, 2000, Retrieved from the Internet: http://www.xml.com/pub/a/2000/11/11/22/schematron.html>, pp. 1-8.
Harold, E.R., et al. "XML in a Nutshell," Jan. 2001, Retrieved from the internet: http://www.oreilly.com/catalog/xmlnut/chapter/ch09.html>, pp. 1-20.
Clark, J., "XML Path Language (Xpath): Version 1.0", W3C Recommendation Nov. 16, 1999, downloaded from: www.w3.org/TR/xpath, 33 pages. Retrieved from internet: <http://www.w3.org/TR/1999/REC-xpath-1999116.html> on Dec. 5, 2011, 33 pages.
"Deja Power Search Graphical User interface", Sep. 23, 1999, Retrieved from: <web.archive.org/web/19991008231252/http://www.exit109.com/.about.jeremy/n- ews/deja.html>, 20 pages.
U.S. Appl. No. 13/460,399, Non Final Action, Sep. 19, 2014, 6 pages.

\* cited by examiner

METHOD AND APPARATUS FOR VIEWING ELECTRONIC COMMERCE-RELATED DOCUMENTS

RELATED APPLICATIONS

This application is a continuation application of U.S. patent application Ser. No. 12/190,493 filed 12 Aug. 2008, entitled "METHOD AND APPARATUS FOR VIEWING ELECTRONIC COMMERCE-RELATED DOCUMENTS," issuing as U.S. Pat. No. 8,561,022 on 15 Oct. 2013 which is a divisional application of U.S. patent application Ser. No. 09/794,302 filed 27 Feb. 2001, entitled "METHOD AND APPARATUS FOR VIEWING ELECTRONIC COMMERCE-RELATED DOCUMENTS," now U.S. Pat. No. 7,415,669, issued on 19 Aug. 2008.

These applications are incorporated herein by reference.

BACKGROUND OF THE INVENTION

Electronic commerce between businesses has gained substantial momentum. Electronic marketplaces and XML or similar documents have begun to replace traditional EDI formats for commerce-related documents. Still, many businesses, particularly small and medium sized businesses, have not adopted automated EDI or XML transaction processing. It remains easier for large trading partners to generate XML or similar documents than it is for small to medium sized businesses to adopt the technology needed to processing them. In addition, a full scale conversion to EDI or XML transaction processing may involve far more documents than a small to medium sized business can practically convert, either within a workable timeframe or a reasonable budget.

Therefore, it is desirable to introduce methods and devices that allow users to read and understand XML and similar documents generated by their trading partners without extensive programming. It is also desirable to introduce methods and devices that are extensible, that can display in a meaningful format field types that are not referenced in output formats.

SUMMARY OF THE INVENTION

The present invention includes a method of providing users with formatted access to XML and similar documents received from trading partners using a general purpose viewer or browser. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
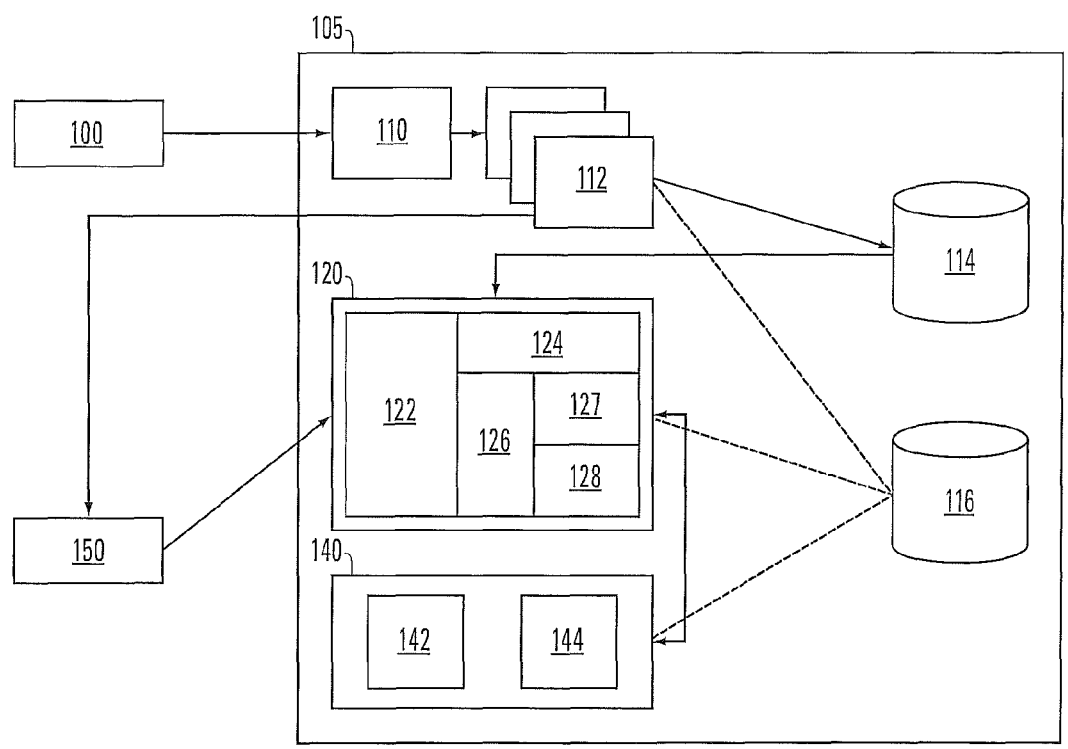
FIG. 1 is a block diagram of a system handling documents in accordance with aspects of the present invention.

FIG. 1 depicts a system 105 practicing various aspects of the present invention. Interacting with the system are an entity 100 which sends a document to the system and a user 150 who views the document stored by the system. The entity sends the document to a server 110. The document may be sent to a location at which the server acts as a router based on the addressee or the addressee and document type or it may be sent directly to a location specified for the type of document being sent. For instance, a global directory may be published that identifies locations to which participants in a marketplace desire for documents of various types to be sent. The locations may be specified in the form of market participant IDs or URLs. A market participant may have multiple IDs or URLs.

Figure 2:
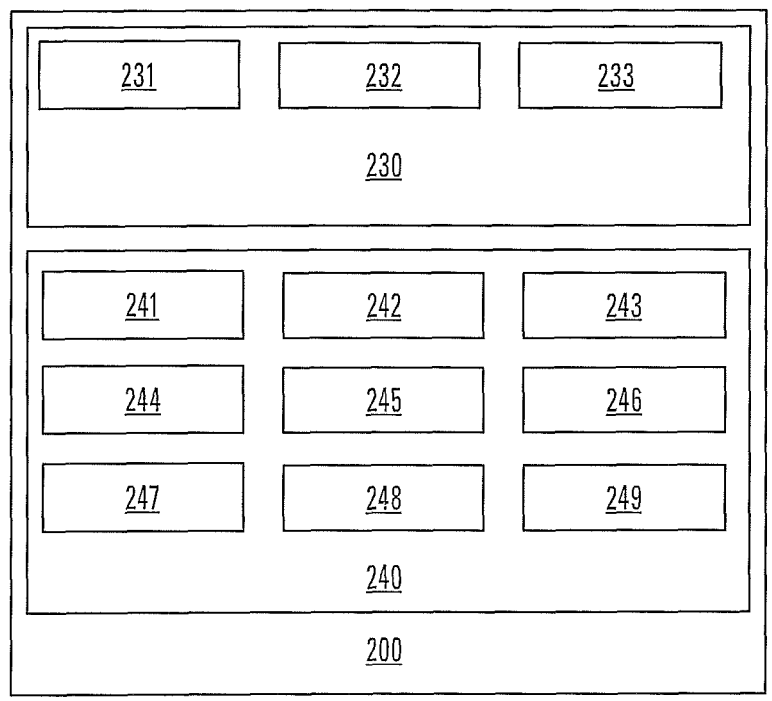
FIG. 2 is a block diagram of a document including tagged fields.

The document sent by the entity includes tagged fields. A sample document having two different types of tagged fields is illustrated in FIG. 2. The document 200 may have one or more parts 230, 240. For instance, the document may include a MIME header and an XML body. A MIME header may be compliant with RFC 822. The header 230 includes a plurality of tagged fields 231-233. The body 240 also includes a plurality of tagged fields 241-249. Alternatively, the document may have only one part or one type of tagged fields. These tagged fields may comply with a schema, such as an xCBL schema by Commerce One or a cXML schema by Ariba. A schema is characterized by tagged fields having types and super types. Types inherent properties from the supertypes on which they are based. Types are defined based on their supertypes and having additional properties. Other standards to which tagged fields may comply include SOX by Commerce One, eCX, the OAGI standard of Open Applications.org, the BizTalk standard by Microsoft, the Rosetta Net standard by Rosetta Net.org, and EDI X12 832. More generally, the tagged fields may be consistent with any published or private standards.

Figure 3:
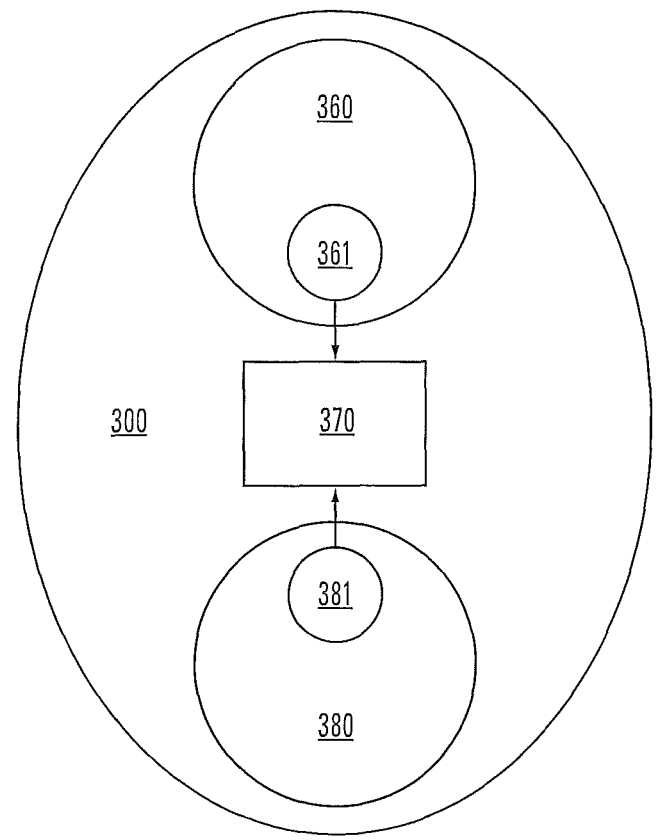
FIG. 3 illustrates participants in a marketplace.

Referring to FIG. 1, the entity which sent a document to the system 100 is an electronic trading partner of the entity to which the user 150 belongs. The relationship of trading partners is illustrated in FIG. 3. The trading partners participate in a trading network 300. This network may be hosted by a single entity or it may be a collaboration of networks hosted by distinct entities. The trading partners may both use the same host or they may use different hosts which route messages among themselves. Two trading partners 360, 380 are illustrated. Participants on behalf of the trading partners 361, 381 may be systems or human beings. Referring again to FIG. 1, the entity 100 which sends the document to the system 105 may be either a system or human being. Purchasing systems are examples of entities which generate tagged field documents and send them to systems. Purchasing agents are examples of entities which can generate tagged field documents and send them to systems and are able to view formatted documents received by a system.

On the server 110 of FIG. 1, one or more services 112 may be available. The service 112 handling the document sent by entity 100 will persistently store the incoming document. It also may notify a user and that the document has been received. A database 116 may be used to control persistent storage. An electronic commerce database may include a repository of schemas for standard and entity defined business documents, a repository of Java beans, C structures, Pascal records or scripts useful to electronic commerce, the document map repository for translation of documents from one format to another (e.g., the xCBL to an export format) and for transformation of documents from one type to another (e.g., from a purchase order to a shipping confirmation.) The electronic commerce database may further include repositories for report layouts and presentation layouts. A trading partner directory is also useful. The trading partner directory may, as described above, identify URLs to which the sending entity 100 transmits documents. Persistent document storage 114 may be on the same disk storage unit as the database repositories 116 or may be a different unit. Persistent document storage 114 need not be part of a database. An indexed flat file would suffice to store XML-compliant documents. The service 112 which receives the incoming document will index one or more of the tagged fields and store the document. Indexing may be accomplished by the service or by a database system managing the persistent storage 114, or by any other subsystem. The service 112 also will notify the user 150 of receipt of the document. The document may or may not be validated against a schema stored in the database 116 before it is stored. A schema stored in the database 116 may be used to interpret the document. One or more Java beans or scripts stored in the database 116 may be used to act upon the document before it is stored.

Figure 4:
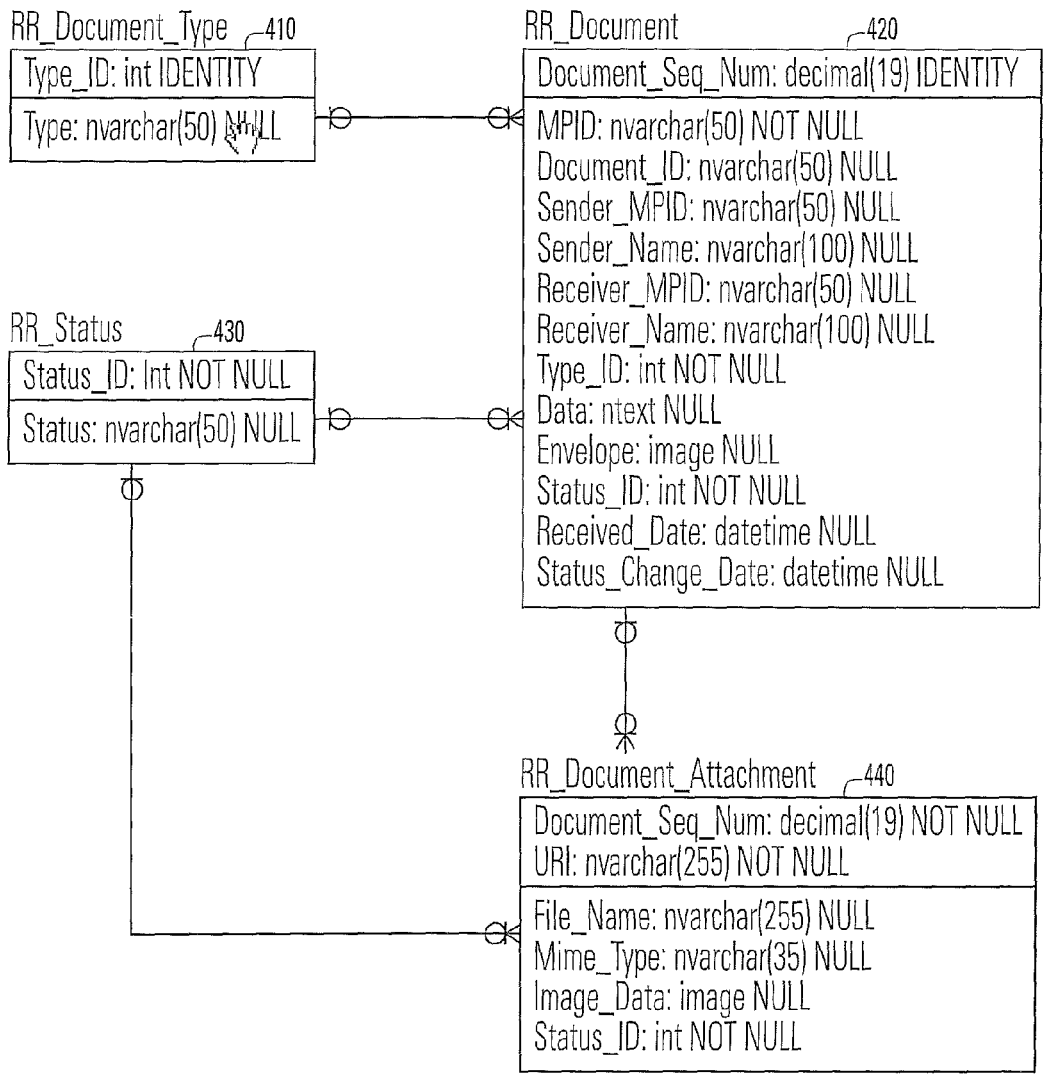
FIG. 4 depicts assignment of a URI value to a typed variable.

One schema for persistently storing documents is illustrated by FIG. 4. In this schema, the document and its header are captured in structure 420. Document attachments are captured in structure 440. Limited sets of document type and status are maintained in structures 410 and 430, respectively. The one to many connections between structures 410 and 430, on one hand, and 420, the other hand, indicate that this schema contemplates that a document will have only one type and only one status. Other arrangements may equally well practice aspects of the present invention.

The service 112 may give notice to the user 150 of receipt of the document by messaging, posting or any other practical means. One or more users may be given notice, based on the identity of the sending entity, the identity of the receiving entity or the document type. One syntax for subscription by a user is Subscription=sender ID.recipient ID.document type. To receive all Order documents from a particular sending entity, a user could subscribe as follows: Subscription=S1234.*.Order. This subscription would cause the service 112 to notify the user 150 of receipt of order type documents from sending entity S1234. Security features of a system would, of course, restrict access by the user 150 those receiving entities for which the user was authorized. Notice may be given by messaging, such as e-mail or a Lotus Notes messaging protocol. A message may include a subject, such as, "Five new documents received," header text generally stating that new documents have been received or that old documents remain to be viewed. The e-mail may further include body text providing the date, number and sending parties' identities for documents received. The body text may further provide detail regarding individual documents received, such as the document type, sender identity and date or time of receipt. A footer may identify the location for viewing the document, such as by a click through URL. Alternatively, notice may be given by posting at a location to which the user has access. A combination of the two may be used, such as posting to location from which e-mail notices are generated if the user does not promptly access the list. E-mails based on the status of accessing a posted notice may be sent periodically and may include increasingly strong wording or additional addressees, based on the type and/or aging of the received document.

Figure 5:
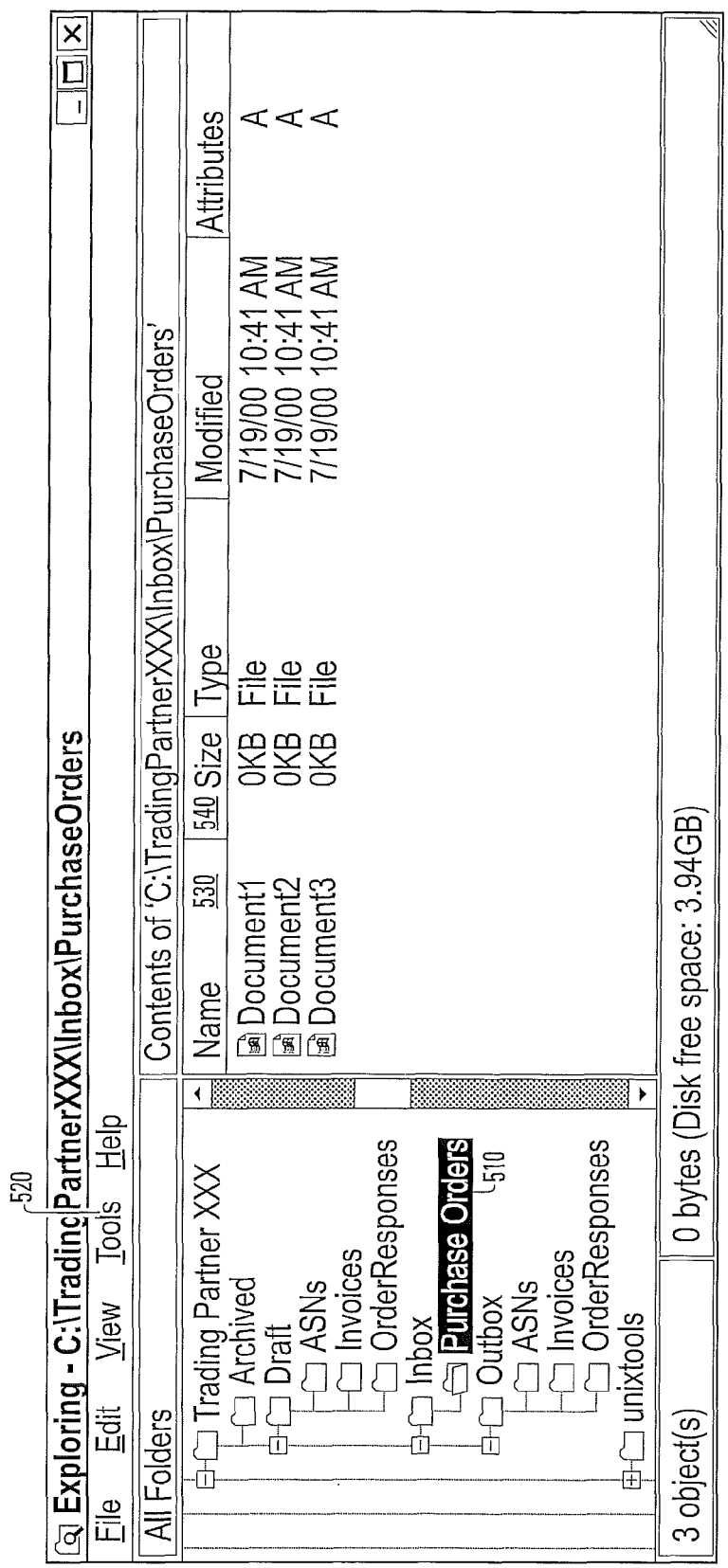
FIG. 5 illustrates a user interface for requesting a view of a document.

In interface by which the user may access a stored document is illustrated in FIG. 5. The particular interface used is not important to the present invention. This interface is based on a standard file explorer. Documents of a particular type, for instance a purchase order, are indicated by a folder 510 in the user's in box. Individual documents are identified by some type of identifier 530 and by any other attributes 540. Tools 520 may be provided for sorting and searching through documents, either within or among document types. Useful fields for sorting and searching may include document type, marketplace identity for the electronic commerce marketplace from which the document originated, portal ID for further identification when a marketplace is hosted by more than one portal, sender ID for the trading partner that sent the document, receiver ID for the trading partner to whom the document is addressed, status of reviewing the document, status of reviewing the document attachments, and date/time stamps for when a document was sent and when it was received. The review statuses may include read, not read or marked. A document which has been read may be marked "not read" by the user. Global trading partners or users may identify additional statuses. These useful fields also may be used to control the formatting of the document for display to the user, as explained below.

The processing of user requests to view a document can be understood by referring again to FIG. 1. A user interface application 120 may include a web server 122, a data storage interface 124, and in box 126, one or more services to read the document and its attachments 127 and to search and list received documents 128. The web server 150 may include Microsoft's WebServer software, a Java interpreter such as JRun 2.3.3 and a servelet container. The data storage interface 124 may use resources of the database 116. The service for reading received documents and attachments 127 may utilize a presentation layout repository maintained in the database 116 to format documents persistently stored 114. The service for searching and listing documents 128 may access a report layout repository in the database 116 for displaying either indexed or non-indexed tagged fields persistently stored 114. The service 127 is illustrated as being coupled with a transformation engine 140. This transformation engine may include selection logic 144 to select a tagged fields format for display sheet, which is applied to a particular document, and transformation logic 142, which applies a tagged fields format for display sheet to a particular document and produces a formatted version of the document. The selection logic 144 may access a document map repository, a report layout repository and a presentation layout repository stored in the database 116. The transformation logic 142 also may access presentation layouts stored the database 116.

One aspect of the present invention is the selection logic 144 to select a tagged fields format for display sheet to apply to a particular document. As a shorthand, a tagged fields format for display sheet may be referred to as a stylesheet. A stylesheet can be applied to format a document for manual viewing either one it is received or in response to a user request. Formatting a document when it is received requires automatic selection of tagged fields format for display sheet and storage of the transformed document, as well as original document. The transformed document can take a form of an HTML document, PostScript document, and an ASCII document or any other view will format. The transformed document can be stored the same persistent storage 114 as the original document or in other storage. Alternatively, formatting can be applied for manual viewing in response to user request. In this case, selection of a tagged fields format for display sheet can be automatic or can present a tailored list of choices to user for user selection.

Automatic selection of style sheets may be supported by the system of default in progressively more customized style sheets. A hierarchical, rule based selection may be used. For instance, one or more default style sheets may be provided at level 0. Alternative style sheets of level 0 may be distinguished based on the amount of data received in an incoming document. For instance, style sheets may be provided for incoming documents smaller and larger than 25,600 bytes. Style sheets at level below 0 may be customized based on a number of attributes associated with a document. The attributes may include document type, marketplace identity for the marketplace from which the document originated, portal identity for further identification when a marketplace is hosted by more than one portal, sender identity for the trading partner that sent the document, receiver ID for the trading partner and to whom the document is addressed, and status of reviewing the document or its attachments. A further attribute which may be useful in selecting a stylesheet is an identifier for the schema used to understand the types of tagged fields appearing in the document, if the tagged fields are compliant with a schema. One hierarchy of levels which can be used to select a stylesheet is:

0=default
1=document type
2=document type+marketplace identity of document origination
3=document type+sender identity
4=document type+sender identity+receiver identity
5=schema used+document type+marketplace identity of document origination+portal identity
6=schema used+document type+marketplace identity of document origination+sender identity
7=schema used+document type+marketplace identity of document origination+receiver identity
8=schema used+document type+sender identity+receiver identity+marketplace identity of document origination A stylesheet can be selected using a tagged field of the document or a property associated with the document or user. A user can combine tagged field and property information in any way to create a stylesheet selection rule. Selection logic can, for example, load all of the default and user created rules and apply them at runtime, substituting values of tagged fields and properties for keywords appearing in rules. Alternative decision rules can be applied. For instance, a stylesheet may be selected on the basis of which rule level it satisfies, selecting the stylesheet which is most customized to the substituted values. Applying this procedure, style sheets could be stored in the database or a simple directory tree. The directory tree might be structured as follows:

0=root/default.xsl
1=root/purchase order/default.xsl
2=root/purchase order/MP1/default.xsl
3=root/purchase order/TPS1/default.xsl
4=root/purchase order/TPS1/TPR2/default.xsl, etc.

Applying the directory tree structure such as this, the selection logic could construct directory paths and test to determine whether a tagged field format for display sheet exists in each of the constructed paths. Alternatively, rules could be selected on the basis that the rule with the most matches wins. The following table may reside be used to track style sheets:

| ID | DocType | Market place | Sender | Receiver | StyleSheet |
|----|---------|--------------|--------|----------|------------|
| 0 | * | | | | Default.xsl |
| 1 | PurchaseOrder | | | | PurchaseOrder.xsl |
| 2 | PurchaseOrder | | OfficeD | | OfficeDPO.xsl |
| 3 | PurchaseOrder | | | OfficeD | OfficeDPO.xsl |
| 4 | PurchaseOrder | | Boeing | | BoeingPO.xsl |
| 5 | PurchaseOrder | | Boeing | GE Aero | BoeingGEAeroPO.xsl |
| 6 | PizzaDelivery | | PizzaHut | | PizzaHutPizza.xsl |
| 7 | PizzaDelivery | | Dominos | | DominosPizza.xsl |
| 8 | PizzaDelivery | | | | Pizza.xsl |
| 9 | PizzaDelivery | Chicago | | | ChicagoPizza.xsl |
| 10 | PizzaDelivery | NewYork | | | NewYorkPizza.xsl |
| 11 | PizzaDelivery | NewYork | PizzaHut | | PizzaHutNYPizza.xsl |

The selection logic can query the table based on the DocumentType and iterate through the result list. As it iterates through the result list, it will can rank each of the result list that qualified. A record that does not qualify will be dropped from the ranking list. The record with the highest ranking number will be the one get selected. For instance, for a PO document was sent to XYZ from ABC. The selector will have the following result list:

| Rule ID # | Ranking # | Why |
|-----------|-----------|-----|
| 1 | 1 | Matches the PurchaseOrder doc type |
| 0 | 0 | Matches the default doc type |

Applying this approach, the selection logic would select Rule ID #1 since it has higher ranking. In another instance, consider a Pizza Document was sent by PizzaHut in a NewYork GMP. The selector will have the following result list:

| Rule ID # | Ranking # | Why |
|-----------|-----------|-----|
| 11 | 3 | Matches the Pizza + marketplace + Sender |
| 10 | 2 | Matches the Pizza + marketplace |
| 8 | 1 | Matches Pizza default doc type |
| 0 | 0 | Matches the default doc type |

The selection logic would select Rule ID #11 since it has the high-ranking. The selection system need not be hierarchical in order to supply default in alternative rules. Combinations of tagged field values and document properties may be used in any way practical to select an applicable stylesheet or the best applicable stylesheet.

An individual user selects or is assigned to a locale. A locale is a more general concept than a language, because the same language (e.g., English) can be spoken in distinctly different ways (e.g., British and American English). Data received from trading partner may be transformed for display based on the locale or language of the user. One aspect of the present invention is that selection of one from a plurality of tagged field format for display sheets may correspond to localization of the display to match the language or locale of the user. Organization and locale can be combined to select a tagged field format for display sheet; they may be combined with the content of one or more tagged fields or properties of the document. A particular tagged field format for display sheet or one or more modules supporting that particular sheet can be stored on disk or remote storage until needed. One aspect of the present invention is loading the selected tagged field format for display sheet or modules supporting it from disk or remote storage after selecting it.

FIGS. 7-11 and the following code illustrate one transformation of a document for display to a user. One aspect of this particular transformation is that tagged fields conform to a schema and tagged fields of unrecognized types have recognized supertypes. In this sense, the recognized supertype may be a parent, grandparent or other ancestor of the unrecognized type. This particular transformation accepts fields of unrecognized types and formats them based on recognized supertypes of the unrecognized types. Alternatively, the transformation logic could evaluate the contents of a tagged field and apply a general format consistent with those contents.

Figure 7:
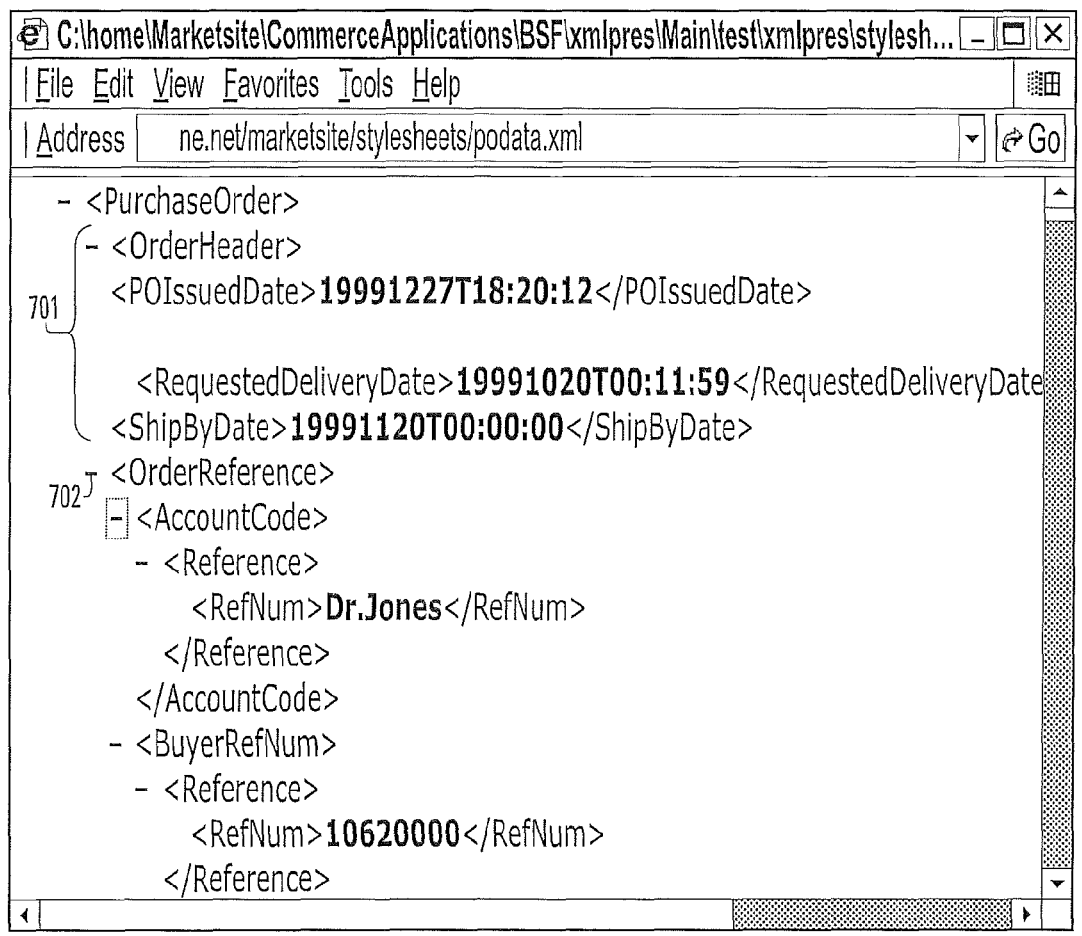
FIGS. 7 and 8 are an example of a document and a transformation for display.
Figure 8:
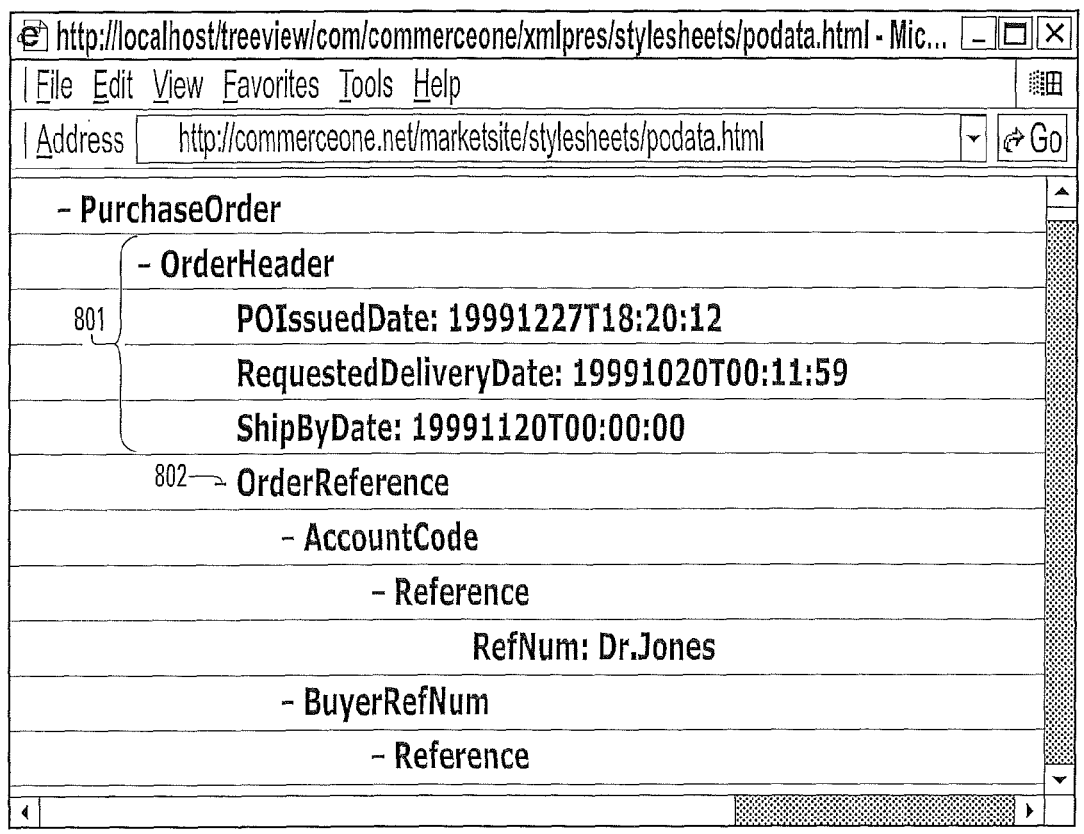

FIG. 7 illustrates a received document. This example is a purchase order compliant with XML and supported by a xCBL schema, displayed using Internet Explorer. The order header 701 of this purchase order includes several tagged fields: purchase order issued date, requested delivery date and ship by date. The "-" 702 depicts a feature of Internet Explorer's XML viewing capability which allows the user to collapse for expand structured XML data for viewing. FIG. 8 illustrates transformation of this XML format for viewing by a user. The transformed data is compliant with the browser. In this instance, the browser is Internet Explorer. Any other browser may be used. The transformed data this instance also is HTML compliant. Accordingly, in HTML viewer could be used to view the transformed data. The order header 801 is format and to be readable. A more elaborate formatting might converted date field into the user friendly string "Dec. 12, 1999 at 18:20:12 PST". Field identifiers preferably use chosen names instead of tag values of the tagged fields. When localization is applied, the chosen names may be appropriate to the language and dialect of the user. In a localized style sheet, "Compra Orden" might appear as a field identifier instead of "PurchaseOrder".

Many aspects of the present invention are further illustrated in the following code. This code includes a hierarchy of included files for a default stylesheet, as follows:

```
default.xsl
    default0_0.xsl
        defConf.xsl
            default.js (JavaScript)
        elemProc.xsl
            elemConf.xsl
            attrProc.xsl
                attrConf.xsl
```

Figure 9:
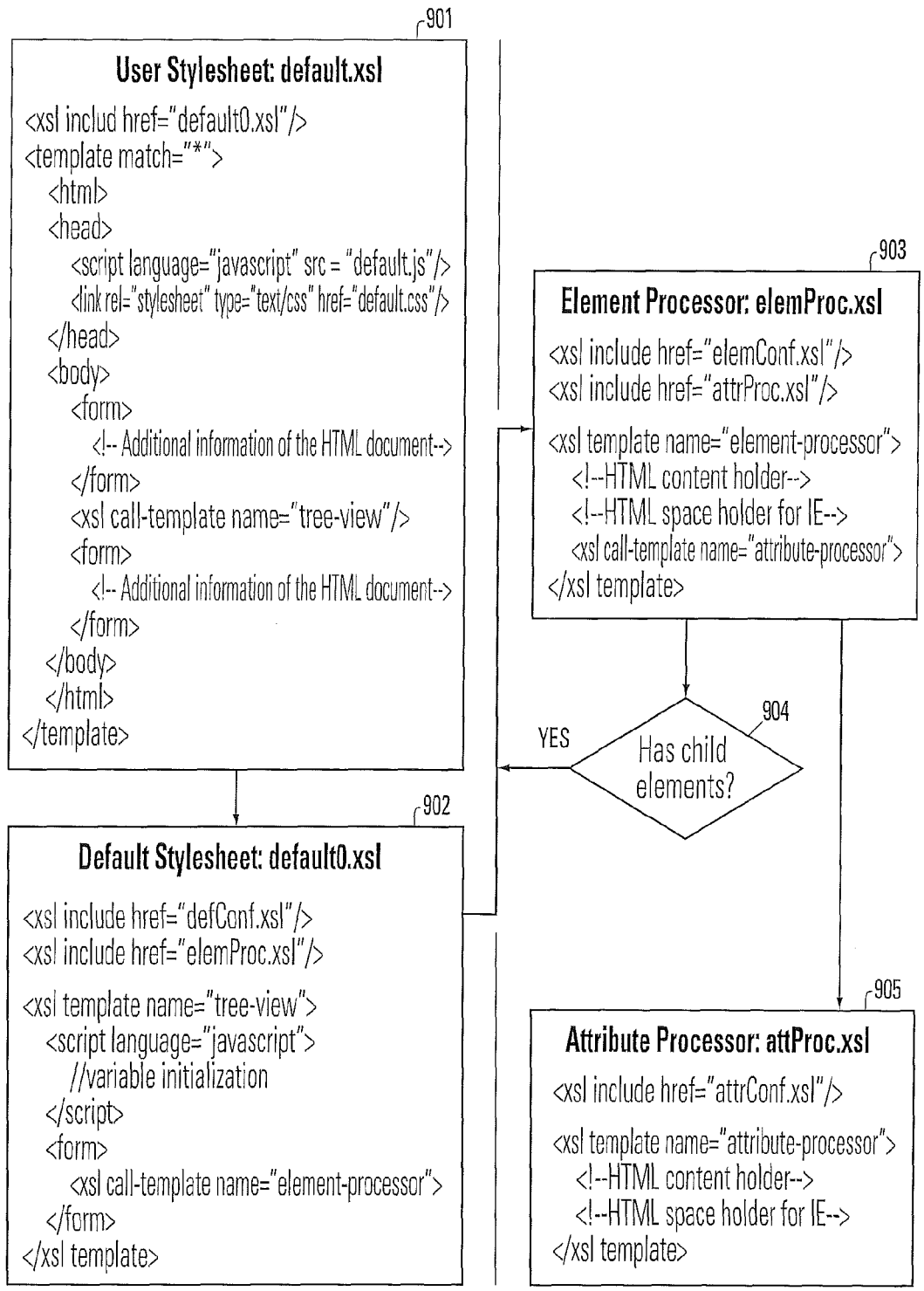
FIG. 9 is an overview of code used to translate XML to HTML, for the display in FIG. 8.

FIG. 9 is a summary of the source code for translation from XML to HTML. This code translates tagged fields in a document into a form compatible with an HTML viewer and with the Internet Explorer and Netscape Communicator browsers. The principal modules of this default stylesheet are default. xsl 901, default0.xsl 902, elemProc.xsl 903, and attrProc.xsl 905. The module elemProc may be invoked multiple times for multiple elements or tagged fields.

Figure 10:
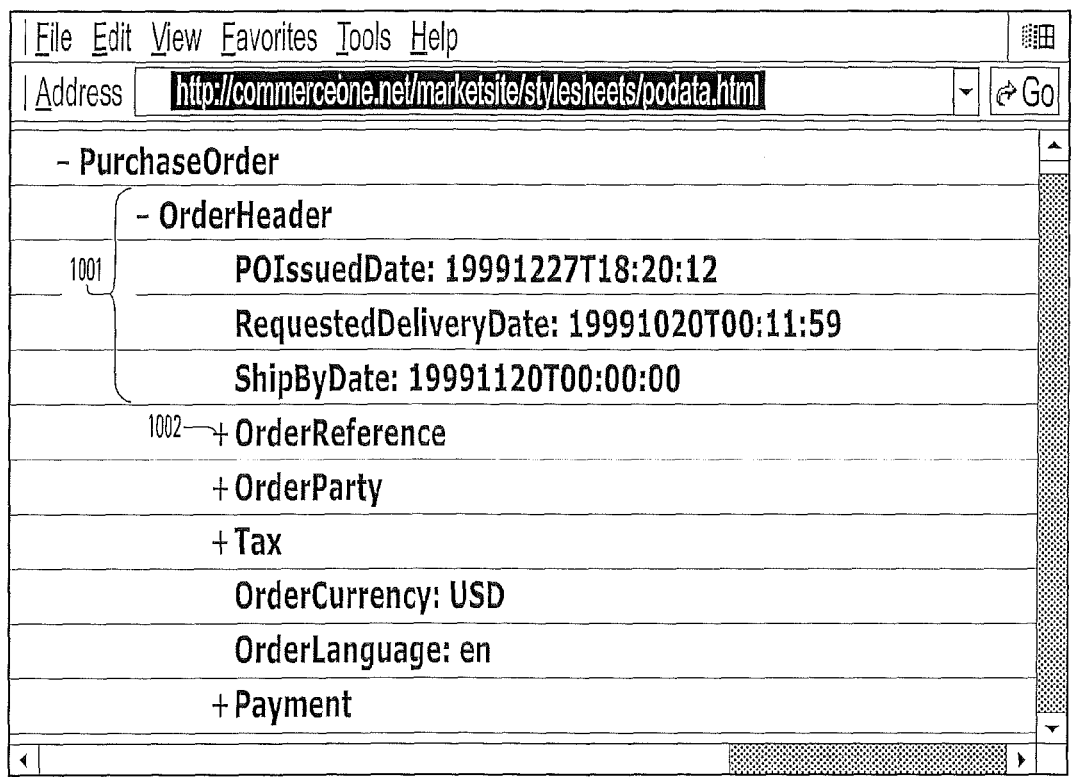
FIG. 10 is a variation on FIG. 8, depicting the effect of a user collapsing data.
Figure 11:
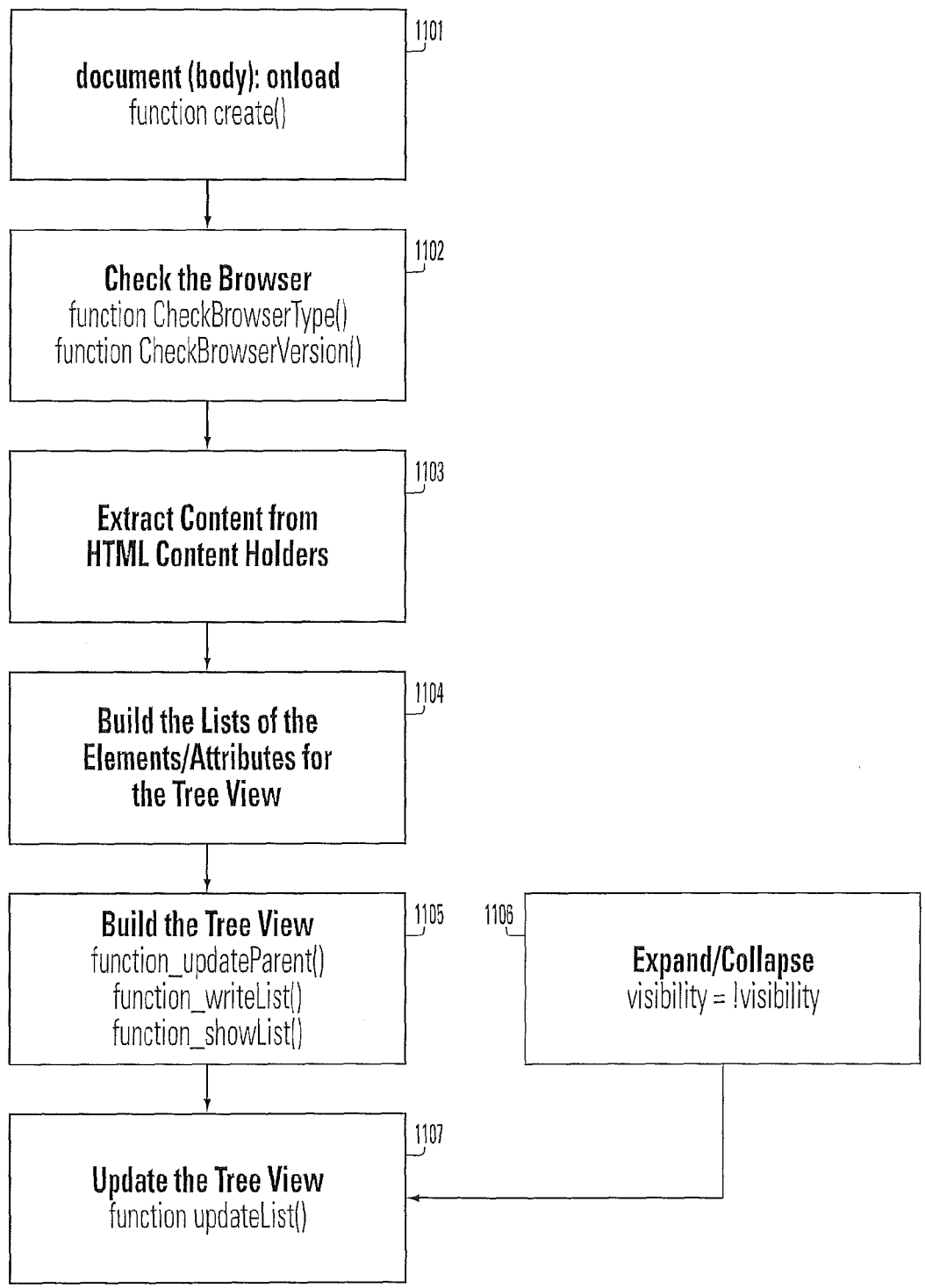
FIG. 11 is a flow chart of HTML to HTML conversion, for the display in FIG. 10.

The default stylesheet further includes a feature to allow outlining features of collapsing and revealing detail. FIG. 10 illustrates this feature. The Order Header 1001 remains uncollapsed, as in FIG. 8. The Order Reference 1002 is collapsed from its appearance in FIG. 8. This formatting may be accomplished by an HTML to HTML transformation. The HTML to HTML transformation is supported by a JavaScript, default.js. FIG. 11 is a high level design flow for transforming HTML to an HTML tree view. The steps or modules for this transformation are 1101 through 1107. The JavaScript remains active, responding to mouse clicks or other user actions which expand or collapse portions of the tree view.

Those of skill in the relevant arts will find the code in the accompanying source code appendix, which is incorporated by reference, to be instructive in carrying out aspects of the invention which have been presented more generally.

The methods illustrated above can be extended by services beyond viewing a document. A document which can be read also can be printed. Print formats can be selected by rules, using the most specific format available: if a print format is available for a combination of trading partner and document type, use that format; if a print format is available for a document type, use that format; if a base format is available for a portal war receiving party, use that format; and, in all cases, a default print format is available to use.

A document map repository may support a copying service, to transform a document from one document to another or from one type of document to another. A new document can be prepared using old documents template, by copying the old document and editing it. A new type of document can be prepared from an old document using document mapping supported by a schema. Static maps may be stored in the database 116 which map tagged fields from one document type to another document type. Copy functionality may, for instance, translate a purchase order into an acceptance or shipping confirmation.

Reply functionality may be supported as a variation on copy functionality, with addressing added. A simple reply may include an unedited version of the document received. A more elaborate reply may permit a user to edit the document received before responding. It may or may not track the changes made. A yet more elaborate reply may provide a user with a variety of transformations which are standard in replying to a particular type of document.

Export functionality may be provided to map one document type to another for editing outside the system. A simple export also may be provided for transforming a document into a tax or were processor format.

Type and send functionality may be provided from either templates of documents used by an organization or from a copy or transformation of a document selected by the user. Preferably, a JavaScript module is provided to update the values of tagged fields based on edits made by the user at the browser. The JavaScript technology described above is readily adapted to carry out this action. An editing functionality may be extended by a verification function, which would take codes entered by the user and verify that they translate into valid addressees, etc., or it could for simply display the translation of the codes. An editing function may be further extended with pull-down selection menus for addresses, using either a dictionary or a list of recently used values.

Corollary to a template facility is a draft document facility. The interface in FIG. 5 depicts now drafts might be stored for later use. A user could create and store in HTML form based on a Sox schema. They could create a document, such as a SOX instance, from an HTML form. They could edit the SOX instance, add attachments, and store the entity created. The user could import material for the entity created from other sources and, eventually, send the draft. An out box could support sending documents and a send box could store copies of documents have been sent.

Figure 6:
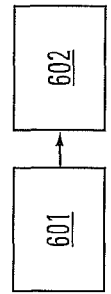
FIG. 6 depicts assignment of a URI value to a typed variable.

FIG. 6 depicts one improvement to the XSLT programming language standard. In XSLT, an "href" type is provided to store a string which is written into the code to specify a universal resource identifier (URI). The URI assigned to the href cannot be changed when or after the XSLT style sheet is invoked. In other words, the URI is static. One aspect of the present invention is an improved method of referring to an XSLT style sheet or module referenced by the URI, including defining a variable type holding a string corresponding to a URI, assigning to a variable of the defined type a string corresponding to a URI; referencing an XSLT style sheet or module based on the variable, and applying the referenced XSLT style sheet or module to the document to generate an output. In FIG. 6, a URI value 601 is assigned to a variable 602 which is then used to reference an XSLT style sheet or module.

Another improvement to the XSLT programming language is conditional loading of modules of an XSLT style sheet. This improvement includes defining a conditional syntax for including an XSLT module from disk in an XSLT style sheet, parsing the XSLT style sheet utilizing the conditional syntax, determining whether a condition specified in the conditional syntax succeeds or fails, and loading the XSLT module from disk if the condition succeeds. This is distinct from and in addition to the selection of a stylesheet described above.

A variable containing a URI value can be used in conjunction with the system in FIG. 1. In connection with selecting one of a plurality of tagged fields format for display sheets, the sheets may be referenced by URIs and selecting the sheet may include dynamically constructing a URI to reference the selected tagged fields for display sheet. Alternatively, a URI corresponding to the selected tagged fields for display sheet may be assigned to a variable and variable subsequently used to reference the sheet. This approach is well adapted to localization of displays. A user locale may be associated with the user and a plurality of tagged fields format for display sheets may correspond to a plurality of locales. The sheets may be referenced by URI strings in a variable defined to receive a particular URI corresponding to the user's locale. Then, selecting a particular sheet include assigning a particular URI string to the variable based on the user locale.

Many combinations of features discussed above can be combined in useful combinations. Some of the useful combinations are set forth in the claims below.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of making tagged documents viewable including:
   receiving a document having a plurality of tagged fields that contain transaction data;
   storing the document in machine readable memory and creating an index for retrieval of the document;
   notifying a user of receipt of the document;
   responding to a request by the user to view the document by applying rules for selecting one of a plurality of style sheets based on content of one or more of the tagged fields of the document that contain transaction data, applying the selected style sheet to the document to generate a result, and outputting the result for display.

2. The method of claim 1, wherein the tagged fields include a document type and the document type is used for selecting.

3. The method of claim 1, wherein:
   the tagged fields include a document type and an identification of an organization originating the document; and
   the document type and the identification of an organization originating the document are used for selecting.

4. The method of claim 1, wherein:
   the tagged fields include a document type, identification of an organization originating the document, and an identification of an addressee; and
   the document type, the identification of the organization originating the document, and the identification of the addressee are used for selecting.

5. The method of claim 1, wherein:
   a schema exists associated with the tagged fields; and
   an identity of the schema is used for selecting.

6. The method of claim 1, wherein the tagged fields have types that conform to a schema, at least one of the tagged fields has a particular type that is not used in the style sheet, and applying the selected style sheet further includes accessing the schema to determine a supertype of the particular type and using the supertype to format the tagged fields.

7. The method of claim 1, wherein notifying includes posting a message at a location accessed by the user.

8. The method of claim 1, wherein the tagged fields deliver content independent of display format.

9. The method of claim 1, wherein the user is using a browser and the request is for a browser-compatible view of the document.

10. A method of making tagged documents available for viewing by a user, including:
    receiving a document having a plurality of tagged fields;
    storing the document to machine readable memory and creating an index for retrieval of the document;
    notifying a user of receipt of the document; and
    responding to a request by the user to view the document by applying a style sheet to the document to generate a result, and outputting the result for display;
    wherein the tagged fields have types that conform to a schema, one or more of the tagged fields has a particular type that is not used in the selected style sheet, and applying the selected style sheet further includes accessing the schema to determine a supertype of the particular type.

11. The method of claim 10, wherein responding further includes selecting one of a plurality of style sheets based on content of one or more of the tagged fields of the document.

12. The method of claim 11, wherein:
    the tagged fields include a document type and an identification of an electronic commerce marketplace where the document originated; and
    the document type and the identification of the electronic commerce marketplace where the document originated are used for selecting.

* * * * *

UNITED STATES PATENT AND TRADEMARK OFFICE
CERTIFICATE OF CORRECTION

| | | |
|---|---|---|
| PATENT NO. | : 9,262,388 B2 | Page 1 of 1 |
| APPLICATION NO. | : 14/054777 | |
| DATED | : February 16, 2016 | |
| INVENTOR(S) | : Andrew Everett Davidson et al. | |

It is certified that error appears in the above-identified patent and that said Letters Patent is hereby corrected as shown below:

On the title page, change Item (72) to read Item (75)

On the title page, insert Item --(73) Assignee Open Invention Network, LLC, Durham, NC--

Signed and Sealed this
Tenth Day of May, 2016

Michelle K. Lee
*Director of the United States Patent and Trademark Office*